United States Patent [19]

Gebhardt et al.

[11] Patent Number: 5,319,015
[45] Date of Patent: Jun. 7, 1994

[54] AQUEOUS RELEASE AGENT FOR THE PRODUCTION OF POLYURETHANE MOLDINGS CONTAINING POLYVINYL ALCOHOL

[76] Inventors: Manfred Gebhardt, Eschenweg 16, D-6430 Bad Hersfeld; Jiri Beranek, Ammernstr. 2, D-8872 Burgau; Friedrich Knöchel, Moltke Str. 2, D-8580 Bayreuth, all of Fed. Rep. of Germany

[21] Appl. No.: 966,577

[22] Filed: Oct. 26, 1992

Related U.S. Application Data

[63] Continuation of Ser. No. 718,413, Jun. 24, 1991, abandoned.

[30] Foreign Application Priority Data

Jun. 23, 1990 [DE] Fed. Rep. of Germany ....... 4020038

[51] Int. Cl.$^5$ .............................. C08L 29/04; B28B 7/36
[52] U.S. Cl. .................................... 524/503; 524/269; 524/318; 524/322; 524/276; 264/300; 264/338
[58] Field of Search ............... 524/503, 557, 269, 318, 524/322, 277, 276; 525/57; 264/300, 338

[56] References Cited

U.S. PATENT DOCUMENTS

| | | | |
|---|---|---|---|
| 2,277,259 | 3/1940 | Schnabel et al. | 525/57 |
| 3,213,051 | 10/1965 | Pink | 524/503 |
| 3,442,845 | 5/1969 | Columbus et al. | 524/503 |
| 3,540,580 | 11/1990 | Columbus et al. | 524/276 |
| 3,996,181 | 12/1976 | Hayashi et al. | 524/503 |

Primary Examiner—Paul R. Michl
Assistant Examiner—LaVonda DeWitt
Attorney, Agent, or Firm—Larson and Taylor

[57] ABSTRACT

An aqueous release agent for the production of polyurethane moldings and more particularly of polyurethane foam moldings, is provided, which in combination with a release substance contain one or more specific polyvinyl alcohols. As such release substance the release agent preferably contains at least in part one or more unsaturated oligomeric or polymeric hydrocarbons with a molecular weight of at least 500 and iodine numbers of at least 60 optionally in the presence of foam stabilizers suitable for polyurethane systems.

9 Claims, No Drawings

AQUEOUS RELEASE AGENT FOR THE PRODUCTION OF POLYURETHANE MOLDINGS CONTAINING POLYVINYL ALCOHOL

This application is a continuation of application Ser. No. 07/718,413 filed Jun. 24, 1991 now abandoned.

For the production of moldings of polymeric materials it is typically necessary to employ effective release agents in order to detach the surface of the moldings from the walls of the mold employed as a tool.

The adhesive properties of the majority of synthetic resins on other materials are well known. A special role is played in this respect by the polyurethanes, whose tacky properties call for the use of specific release agents, which more particularly in the case of customized molding component manufacture make possible a large number of demolding operations without impairing the surface geometry. The release agents for foam components, which are based on the disocyanate-polyaddition reaction, should have a minimum tendency to form deposits in the mold. The usual practice is to apply wax, soap- or oil-based release agents onto the surface of the open mold with compressed air taking care to ensure an even application of the release agent. This operation has to be repeated after each demolding.

Unlike previous practice in accordance with which solvent containing release agent systems were exclusively employed, environmental considerations are now calling for the use of release agents on an aqueous basis. For instance at the present time such aqueous release agents are being employed, which as release substances contain higher molecular hydrocarbons. For this purpose aqueous emulsions of paraffins or aqueous dispersions of polyethylene waxes or aqueous emulsions of polyols, that is to say unsaturated oligomeric or polymeric hydrocarbons, are available.

Basically however the use of these release agents has not proved satisfactory so far, more particularly in the case of the applications in combination with the production of flexible polyurethane foams, to the extent that the surface of the demolded components does not always meet the stipulated requirements.

A further disadvantage is the pronounced degradation of the release agents (entailing the formation of deposits) in the molds so that even short mold cleansing cycles lead to a substantial technological complication.

One object of the present invention is hence the provision of an aqueous release agent for the production of polyurethane moldings, more particularly foam polyurethane moldings, with which the properties of the surfaces of the polyurethane moldings may be improved.

This object is closely tied to an improved release action of the aqueous emulsion in accordance with the invention, whose benefit is felt if the operator should have once forgotten to have sprayed the mold wall surfaces with release agent. In this respect a further object of the present invention has to attain an improved "melting on" of the release substances so as to entail the creation of a homogeneous release agent film in the heated molds in order to ensure the unimpaired efficacy of the foam stabilizer at the interface between the release agent and the foam material.

A further significant object of the present invention is to use the aqueous release agent to produce a barrier effect with respect to the isocyanate-water reaction in such a manner that the reaction involving the formation of associated solid polyurea is so affected that on the one hand there is less soiling of the mold with less effort being needed to clean it and on the other hand the degree of embrittlement of the polyurea is minimized so that thermally induced shrink strains ensure a homogeneous elastic layer of the release agent.

In accordance with the present invention this object is attained by a aqueous release agent which contains the release substances in combination with one or more partly or completely saponified polyvinyl acetates. In this respect it is preferably a question of partly or completely saponified polyvinyl acetates in the form of statistical polyvinyl alcohols of the general formula

—AABABABBBABAABABBABAABBB— wherein

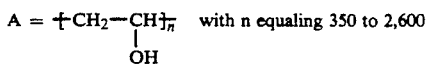 with n equaling 350 to 2,600 and

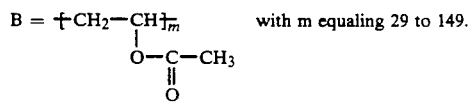 with m equaling 29 to 149.

The aqueous release agent in accordance with the invention contains the polyvinyl alcohol or mixtures thereof in a quantity equal to 0.1 to 5%, and preferably in a quantity of 0.8 to 3%, of the overall weight of the release agent.

Partly saponified polyvinyl alcohols or mixtures thereof which are preferably employed in the invention include those which have a degree of saponification of 71.6 to 87.7 mole %.

In accordance with the present invention the release substance consists at least in part of one or more unsaturated oligomeric or polymeric hydrocarbons, optionally in combination with foam stabilizers suitable for polyurethane systems, the unsaturated oligomeric or polymeric hydrocarbons having a molecular weight of at least 500 and preferably 1,000 to 10,000 or, more specifically, 2,500 to 6,000 and iodine numbers of at least 60 and preferably 150 to 600.

The unsaturated hydrocarbons preferably utilized in the combination in accordance with the invention may be homo- or copolymers or block copolymers and are preferably liquid or flowable at room temperature in the processing conditions. They preferably do not contain the double bonds in a conjugated form so that the unsaturated hydrocarbons which are more preferably utilized in the invention include those which are oligomers or polymers of isoprene and/or butadiene and optionally may be copolymerized or block copolymerized with other monomers which are able to be polymerized therewith. Furthermore they may have additional functional groups, more particularly groups containing oxygen and/or nitrogen, which contain Zerewitinoff active hydrogen atoms.

An unsaturated hydrocarbon which is more particularly to be used in the invention is a liquid polybutadiene, which is referred to as UKW liquid in the examples, and has a molecular weight of approximately 3,000 and an iodine number of approximately 450.

The aqueous release agent in accordance with the invention contains the unsaturated hydrocarbons preferably in an quantity equal to 0.5 to 50%, and more particularly 1 to 40%, or more specifically still 2 to 10%, of the overall weight of the release agent. The quantities which are best suited to the respective polyurethane system are to be determined experimentally in a conventional manner as familiar to those in the art.

The aqueous release agent in accordance with the invention may however furthermore contain as a release substance at least in part a silicone oil which is conventional for this purpose, preferably a polydimethylsilicone, which may be substituted with aliphatic and/or aromatic hydrocarbon radicals, and/or at least in part fats and/or oils, which are conventional for this purpose, and/or at least in part a liquid or solid natural or synthetic wax, which is conventional for this propose. As emulsifiers it is possible to employ conventional emulsifiers in conventional quantities.

As foam stabilizers it is possible to use the foam stabilizers which are conventional for the respective polyurethane foam systems. Foam stabilizers which are preferred in the invention include polysiloxane polyether copolymers with various different structures, and they are for instance those described in the textbook "Polyurethane" by Becker and Braun published by Hanser Verlag, Munich and in the U.S. Pat. Nos. 2,834,748, 2,917,480 and 3,629,308 and in the German patent publication 2,558,523 A.

Moreover the aqueous release agents in accordance with the invention may contain conventional additives, as for instance biocidal substances, amine compounds, quaternary ammonium compounds, surface modifying substances (bentonites) etc.

The following examples (in which M denotes molecular weight) will serve to explain the invention without however limiting the same.

EXAMPLE 1

An aqueous release agent, which is utilized during production of flexible polyurethane foam moldings, has the following composition:
20% by weight of UKW liquid (see supra)
3% by weight of polyvinyl alcohol (M=84,000, n=1,720, m=96)
4% by weight of emulsifier: Mulsifan RT 231, a combination of alkylaryl- and alkylpolyglycolethers (commercially available from the Zschimmer & Schwarz Company)
2% by weight of the foam stabilizer DC 190 (commercially available from the Dow Corning Company)
71% of water.

EXAMPLE 2

A further aqueous release agent, which is employed during production of rigid polyurethane foam moldings, has the following composition:
70% by weight of water
10% by weight of UKW liquid (see supra)
10% by weight of microwax (FP 70° C.)
4% by weight of polyvinyl alcohol (M=84,000, n=1,720, m=96)
4% by weight of emulsifier: Mulsifan RT 231, a combination of alkylaryl- and alkylpolyglycolethers (commercially available from the Zschimmer & Schwarz Company)
2% by weight of the foam stabilizer DC 190 (commercially available from the Dow Corning Company)

EXAMPLE 3

A further aqueous release agent emulsion for flexible polyurethane foam moldings has the following composition:
3.5% by weight of UKW liquid (see supra)
4.7% by weight of synthetic hydrocarbon wax (FP 71° C.)
1.2% by weight of polyvinyl alcohol (M=26,000, n=530, m=31)
2.0% by weight of foam stabilizer DC 190 (commercially available from the Dow Corning Company)
0.9% by weight of emulsifier Emulan P (ethoxylated fatty alcohol, commercially available from the BASF Company)
1.5% by weight of emulsifier Unitox 450 (ethoxylated fatty alcohol, commercially available from the Petrolite Company)
86.2% by weight of water.

EXAMPLE 4

A further aqueous release agent for flexible polyurethane moldings has the following composition:
3.8% by weight of synthetic hydrocarbon wax (FP 71° C.)
1.5% by weight of microwax (FP 70° C.)
1.0% by weight of polyvinyl alcohol (M=26,000, n=530, m=31)
1.35% by weight of foam stabilizer DC 190 (commercially available from the Dow Corning Company)
either
1.5% by weight of emulsifier Unitox 450=ethoxylated fatty alcohol (commercially available from the Petrolite Company)
or
1.5% by weight of emulsifier Emulan P=ethoxylated fatty alcohol (commercially available from the BASF Company)
90.85% by weight of water.

EXAMPLE 5

A further aqueous release agent for flexible polyurethane moldings has the following composition:
4.7% by weight of UKW liquid (see supra)
3.8% by weight of synthetic hydrocarbon wax (FP 71° C.).
1.5% by weight of microwax (FP 70° C.)
1.0% by weight of polyvinyl alcohol (M=26,000, n 530, M=31)
1.35% by weight foam stabilizer DC 190 (commercially available from the Dow Corning Company),
either
1.5% by weight of emulsifier Unitox 450=ethoxylated fatty alcohol (commercially available from the Petrolite Company)
or
1.5% by weight of emulsifier Emulan P=ethoxylated fatty alcohol (commercially available from the BASF Company)
86.15% by weight of water.

We claim:

1. In the production of polyurethane moldings wherein a release agent for said polyurethane moldings is applied onto the surface of molds in which polyurethane moldings are formed, the improvement comprising using as said release agent an aqueous composition consisting essentially of water, an emulsifier, one or more unsaturated oligomeric or polymeric hydrocarbons having a molecular weight of at least 500 and an iodine number of at least 60, and about 0.1 to 5%, based on the overall weight of the aqueous composition, of a partly or completely saponified polyvinyl acetate having the structure:

—AABABABBBABAABABBABAABBB— wherein

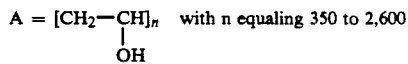

and

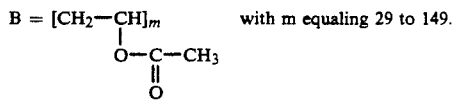

2. The improvement according to claim 1 wherein the release agent contains partly saponified polyvinyl alcohol or mixtures thereof in a quantity of 0.8 to 4% of the overall weight of the release agent.

3. The improvement according to claims 1 or 2 wherein the partly saponified polyvinyl acetate or a mixture thereof is in the form of one with a degree of saponification of 71.6 to 87.7 mole %.

4. The improvement according to claim 1 wherein the unsaturated hydrocarbons are oligomers or polymers of isoprene or butadiene or mixtures thereof, which may optionally be copolymerized or block copolymerized with other monomers which are able to be polymerized therewith said oligomers or polymers being present in a quantity of 0.5 to 50% based on the overall weight of the release agent.

5. The improvement according to claim 1 wherein the aqueous composition additionally contains foam stabilizers, in a quantity of 0.2 to 6% of the overall weight of the release agent.

6. The improvement according to claim 1 wherein the aqueous composition contains in part a silicone oil release agent.

7. The improvement according to claim 1 wherein said aqueous composition comprises an additional release agent for polyurethane moldings.

8. The improvement according to claim 7 wherein said additional release agent is selected from the group consisting of fats, oils or mixtures thereof.

9. The improvement according to claim 7 wherein said additional release agent comprises a liquid or solid natural or synthetic wax.

* * * * *